United States Patent [19]

Vara et al.

[11] Patent Number: 4,954,593
[45] Date of Patent: Sep. 4, 1990

[54] FURANONE/VINYL ETHER COPOLYMERS

[75] Inventors: Fulvio J. Vara, Chester; James A. Dougherty, Pequannock, both of N.J.; Jeffrey S. Plotkin, Monsey, N.Y.

[73] Assignee: GAF Chemical Corporation, Wayne, N.J.

[21] Appl. No.: 395,687

[22] Filed: Aug. 18, 1989

[51] Int. Cl.$^5$ ............................................. C08F 234/02
[52] U.S. Cl. ................................... 526/270; 428/500
[58] Field of Search ........................................... 526/270

[56] References Cited

U.S. PATENT DOCUMENTS 3,474,111 10/1969 Suld ..................................... 526/270
3,929,735 12/1975 Barabas ................................ 526/270
3,985,942 10/1976 Suzuki et al. ........................ 526/270

Primary Examiner—Bernard Lipman
Attorney, Agent, or Firm—Marilyn J. Maue; Joshua J. Ward

[57] ABSTRACT

The invention relates to a copolymer having the structure

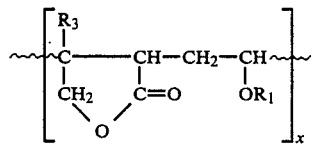

wherein $R_3$ is lower alkyl or hydrogen; x is an integer having a value of from 100 to 15,000; $R_1$ is a saturated radical or a radical having a terminal vinyl group and is selected from the group consisting of alkoxylated vinyl; alkoxylated alkanol; alkyl optionally substituted with one or more vinyl ether, alkylate, hydroxy or alkoxylated vinyl groups and phenyl optionally substituted with one or more lower alkyl, hydroxy, alkoxylate or alkoxylated vinyl groups. The invention also relates to the use of said copolymer as a protective coating.

11 Claims, No Drawings

FURANONE/VINYL ETHER COPOLYMERS

Polymers of maleic anhydride have been extensively used as gelling agents, thickeners, stabilizers and adhesives. For certain specific uses, they have also been applied as coatings because of their clear film forming properties. However, such coatings are water soluble and lack the high degree of resistance to acid and alcohol attack.

Accordingly, it is an object of this invention to provide a copolymer having all the beneficial properties of the maleic anhydride/vinyl ether copolymers and additionally, high resistance to chemical attack from acids and alcohol.

Another object of this invention is to provide a copolymer which has markedly reduced alkali and water solubility.

Still another object is to provide an abrasion resistant clear, colorless, copolymeric film having high shine and gloss.

Another object is to provide a copolymer suitable for use as a hair spray or as a protective coating on wood, plastic, glass or metal surfaces.

These and other objects of the invention will become apparent from the following description and disclosure.

THE INVENTION

According to this invention there is provided an unsaturated lactone/vinyl ether copolymer having the formula

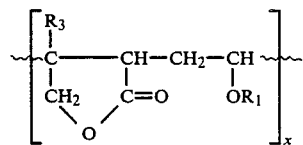

wherein $R_3$ is lower alkyl or hydrogen; x is an integer having a value of from 100 to 150,000; $R_1$ is a saturated radical or a radical having a functional vinyl group and is selected from the group consisting of alkoxylated vinyl; alkoxylated alkanol; alkyl optionally substituted with one or more vinyl ether, alkylate, hydroxy or alkoxylated vinyl groups and phenyl optionally substituted with one or more lower alkyl, hydroxy, alkoxylate or alkoxylated vinyl groups. The alkyl moieties of the $R_1$ group can be branched or linear and may contain a plurality of the above mentioned substituents. Further, the copolymeric product can be linear or crosslinked and is substantially linear when $R_1$ is a saturated moiety but is crosslinked when $R_1$ contains a functional vinyl group.

Preferred species of the copolymer include both crosslinked and non-crosslinked types of which the following formulae are representative

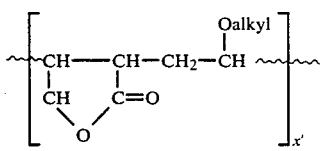

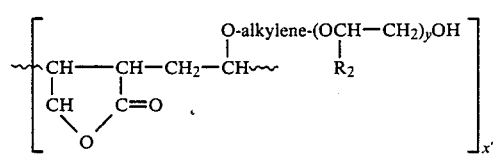

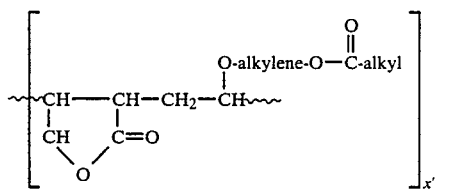

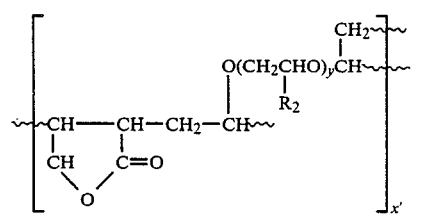

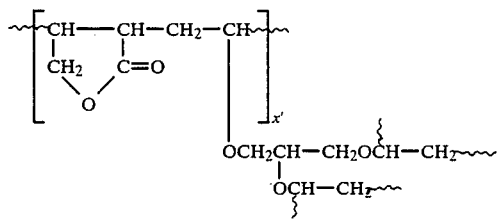

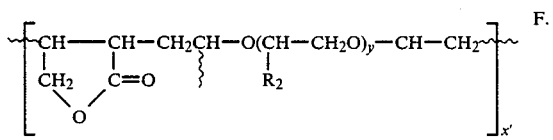

In the above formulae, x' has a value of between 1,000 and 50,000; $R_2$ is hydrogen or methyl and y has a value of from 1 to 10, most preferably from 1 to 5. As represented above copolymers A B, and C are substantially linear, copolymers D and F are moderately crosslinked and copolymer E is highly crosslinked. However, it is to be understood that when a mixture of vinyl ether comonomers are employed, the polymeric chain may contain a combination of linear and crosslinked or moderaely crosslinked and highly crosslinked chains forming the polymeric backbone.

The present polymers, because of the repeating lactone units, and particularly those crosslinked species, are more resistant to chemical attack making them highly desirable candidates for coatings. The more linear polymers, being more flexible, are suited for applications which require more resilient properties. As a hair spray additive used with water or an alcohol, the present copolymer imparts high luster and sheen to the hair along with other conditioning properties.

The reaction for the preparation of the copolymers of the invention is represented by the following general equation

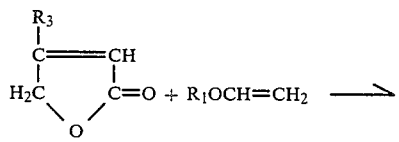

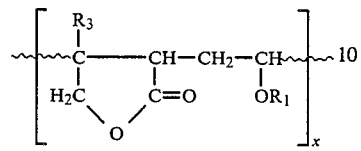

wherein $R_3$, x and $R_1$ are as defined above.

The present polymers are economically prepared by combining the lactone monomer and the vinyl ether monomer in a suitable mole ratio which equates to about one mole of furanone per vinyl group of the vinyl ether. While a small excess of one or the other monomer can be tolerated in the system, this condition is undesirable since neither monomer is capable of homopolymerization; thus the monomer appears as a monomeric contaminant in the product. The reaction is effected by photopolymerization or solution polymerization in an oxygen-free atmosphere in the presence of a free-radical initiator. Alternatively the photopolymerization can be carried out in the presence of air when oxygen scavengers are included in the polymerization mixture. Suitable photoinitiators include benzoin ethers, α-hydroxy- and α,α-dialkylacetophenones, o-acylated- α-oximinoketones, acyl-phosphine oxides, halogenated methyl sulfonyl aromatics, benzophenone, thioxanthanes and Michler's ketone.

The copolymerization can also be effected in the presence of an inert, nonpolar liquid solvent such as toluene, benzene, xylene, cyclohexane, heptane, freons etc. at a concentration of up to about 80% of the monomeric mixture. The use of solvent is recommended in cases where the vinyl ether is a gas, e.g. methyl vinyl ether, or where the vinyl ether monomer is only slightly soluble in the furanone. In cases where solvent is employed, the polymerization is carried out in a sealed reactor and solvent is removed upon completion of the polymerization by evaporation, leaching or any other convenient method.

Thermal initiators are usefully employed for solution polymerization reactions and include lauryl peroxide, decanoyl peroxide, tert-butyl peroxypivalate, etc. of which lauryl peroxide is preferred. The initiator is added to the photo- or solution polymerization mixture in an amount between 0.5 and about 6 wt. %, preferably from about 1 wt. % to about 3.5 wt. % of the total monomers.

The reaction can be carried out at room temperature up to the reflux of the system and below the boiling point of the components, and thus is limited by the boiling point of the solvent or that of the vinyl ether. Generally temperatures between about 20° and 65° C., preferably between about 25° and about 35° C., are employed. Pressures ranging from atmospheric up to about 100 psig can be employed; however, the polymerization is usually carried out under atmospheric conditions. The reaction time varies within a broad range depending upon the use or absence of solvent. In the absence of solvent, the reaction is instantaneous or completed within about 30 seconds, however, the use of solvent may extend the reaction time up to about 5 hours.

When copolymerization takes place in the absence of solvent, the copolymeric product can be directly coated on a substrate such as wood, polyester, glass, ceramic, a painted surface, etc. and then cured in an oven or by exposure to radiation such as UV light, E-beam, gamma rays, X-rays, etc. Curing by UV light exposure is generally effected at between about 300 and about 3,000 milli joules/cm². Radiation curing is completed in less than 5 minutes, usually less than 1 minute exposure; whereas curing by heat requires a longer treatment up to about 2 hours.

Excellent acid and alcohol resistant clear colorless coatings having a high gloss and excellent resistance to abrasion are formed on the aforementioned substrates in a thickness of from as little as about 0.2 to about 10 mils preferably not more than 5 mils. The coating is also resistant to ketones such as methyl ethyl ketone. The present copolymers also possess water repellency properties and are usefully coated on fibers or fabrics such as rain wear. The copolymer may be applied directly on a substrate surface or it may be applied as a solution containing as little as 0.5% copolymer. After solvent evaporation, a thin polymeric, highly stable coating is achieved. Any of the above mentioned solvents are suitable for this purpose. For use in a hair spray or adhesive, the copolymer is solubilized in an inert liquid carrier or introduced into a standard formulation and is employed in concentrations of between about 0.5 and about 20% of the total composition.

As a chemical intermediate, the present copolymer can be reacted with carboxylic acids, esters, amines, amides, alcohols or acid halides to produce other valuable polymeric products.

Having thus generally described the invention reference is now had to the following examples which illustrate preferred embodiments and comparisons with other film forming polymers; however, it is to be understood that these examples in no way limit the scope of the invention which is more broadly set forth above and in the appended claims.

EXAMPLE 1

In a glass beaker, 3.6 grams (0.0178 mole) of triethylene glycol divinyl ether and 3 grams (0.0357 mole) of 2(5H)furanone were blended with 0.21 grams of (1-hydroxycyclohexyl) phenylketone initiator were blended with a mechanical stirrer at room temperature for a period of 30 minutes until a homogeneous mixture is attained. The resulting blend was then coated in a thickness of 0.5 mil on a polyester substrate using a #6 Mayer bar applicator. The coated samples were then placed on a conveyor moving at 40 feet per minute under two 200 watt/inch medium pressure mercury vapor lamps and were cured in an oxygen-free, nitrogen atmosphere. The copolymer formed a clear, hard, abrasion resistant film which was not attacked by acid, alcohol or methyl ethyl ketone and possessed water resistant properties.

EXAMPLE 2

Example 1 is repeated except that methyl furanone is substituted for 2(5H) furanone. The copolymeric product is a hard, clear film having abrasion resistant properties.

EXAMPLE 3

In a glass beaker 3.6 grams (0.0178 mole) of triethylene glycol divinyl ether and 3.5 gram (0.0357 mole) of maleic anhydride were blended at room temperature with 0.21 gram of 1-hydroxy-cyclohexyl-phenyl ketone initiator using a mechanical stirrer until a homogeneous mixture was attained (approximately 30 minutes). The resulting blend was coated in a thickness of 0.5 mil on a polyester film substrate using a #6 Mayer bar applicator. The coated samples were then placed on a conveyor moving at 40 feet per minute and were cured in an oxygen-free, nitrogen atmosphere under two 200 watt/inch medium pressure mercury vapor lamps.

This film was compared with the film formed from the blend of Example 1, and the results of this comparison were reported as follows.

|  | Film from Example 1 | Film from Example 3 |
| --- | --- | --- |
| water resistance[3] | excellent | good |
| 0.1% NaOH[3] | no effect | dissolves |
| 0.1% $H_2SO_4$[3] | no effect | no effect |
| n-butylalcohol | no effect | no effect |
| pencil hardness[1] | 3H | 3H |
| flexibility[2] | pass ⅛ mandrel | pass ⅛ mandrel |

[1]ASTM D3363
[2]ASTM D522
[3]ASTM D1308

EXAMPLE 4

In a glass beaker 3.5 grams (0.0178 mole) of cyclohexanedimethanol divinyl ether and 3 grams (0.0357 mole) of 2 (5H) furanone were blended at room temperature with 0.21 grams of 1-hydroxy-cyclohexyl-phenyl ketone initiator using a mechanical stirrer until a homogeneous mixture was attained (approximately 30 minutes). The resulting blend was then coated in a thickness of 0.5 mil on a polyester film substrate using a #6 Mayer bar applicator. The coated samples were then placed on a conveyor moving at 40 feet per minute under two 200 watts/inch medium pressure mercury vapor lamps in an oxygen free nitrogen atmosphere. The copolymer formed a clear hard abrasion resistant film which was not attacked by acid alcohol or methyl ethyl ketone and possessed very good water resistant properties.

What is claimed is:

1. The copolymer having the formula

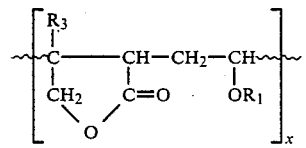

wherein $R_3$ is lower alkyl or hydrogen; x is an integer having a value of from 100 to 150,000; $R_1$ is a saturated radical or a radical having a terminal vinyl group and is selected from the group consisting of alkoxylated vinyl; alkoxylated alkanol; alkyl optionally substituted with one or more vinyl ether, alkylate, hydroxy or alkoxylated vinyl groups, phenyl optionally substituted with one or more lower alkyl, hydroxy, alkylene alkoxylate or alkoxylated vinyl groups and a functional derivative of the radicals when $R_1$ contains a functional vinyl group.

2. The copolymer of claim 1 wherein $R_3$ is hydrogen.

3. The copolymer of claim 1 wherein x has a value of from about 1,000 to about 50,000.

4. The copolymer of claim 1 wherein $R_1$ is a radical having a terminal vinyl group.

5. The copolymer of claim 1 wherein $R_1$ is a saturated radical.

6. The copolymer of claim 1 wherein $R_1$ is an alkoxylated radical.

7. The copolymer of claim 2 wherein $R_1$ is an alkylated radical and contains a terminal vinyl group.

8. The copolymer of claim 7 having the formula

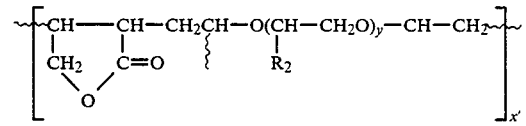

wherein y has a value of from 1 to 5 and x' has a value of from about 1,000 to about 50,000.

9. The copolymer of claim 1 wherein $R_1$ contains a plurality of terminal vinyl groups.

10. The copolymer of claim 9 having the formula

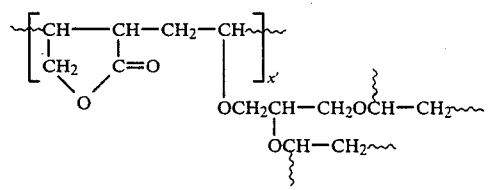

wherein x' has a value of from about 1,000 to about 50,000.

11. The copolymer of claim 2 wherein $R_1$ is unsubstituted alkyl.

* * * * *